United States Patent [19]

Lauritsen

[11] Patent Number: 4,809,506

[45] Date of Patent: Mar. 7, 1989

[54] ENGINE PLANT COMPRISING A PLURALITY OF TURBO-CHARGED COMBUSTION ENGINES

[75] Inventor: Hans C. Lauritsen, Nysted, Denmark

[73] Assignee: MAN B&W Diesel A/S, Hvidovre, Denmark

[21] Appl. No.: 192,126

[22] Filed: May 10, 1988

[30] Foreign Application Priority Data

May 12, 1987 [DK] Denmark .............................. 2395/87

[51] Int. Cl.$^4$ .......................... F02B 73/00; F02D 25/00
[52] U.S. Cl. .......................................... 60/710; 60/612
[58] Field of Search ................ 60/605, 611, 612, 698, 60/706, 710; 123/565

[56] References Cited

U.S. PATENT DOCUMENTS 1,051,308  1/1913  Buchi .................................... 60/698

FOREIGN PATENT DOCUMENTS 215808  10/1941  Switzerland .......................... 60/612

Primary Examiner—Michael Koczo
Attorney, Agent, or Firm—Bacon & Thomas

[57] ABSTRACT

The engine plant comprises a plurality of turbocharged combustion engines (1, 2), the charging air systems of which are interconnected by means of a closeable conduit (14). Conduit (14) is adapted to supply supplementary charging air from the charging air system of a loaded engine (1) to the charging air system of an unloaded engine (2). A stop valve (15) is provided in the conduit and is controlled in dependence on the working condition of the associated engine (2) on the basis of a comparison between the charging air pressure and the exhaust gas pressure. Said comparison of pressures is effected by means of a surveillance unit (18) accommodating a duct system with two separate branches connected with the charging air system and the exhaust gas system, respectively. The branches are connected with a common outlet and a thermosensor is provided in either branch. By suitable dimensioning of the surveillance unit (18) it is obtained that said two thermosensors—dependent on the prevailing pressures—are either surrounded by two different gas flows or surrounded by the same gas flow. This provides for obtaining that a traditional measuring of pressures with the particular problems involved in this respect is avoided since the aim is now merely to detect a temperature difference which may be effected irrespective of the actual pressure conditions.

2 Claims, 2 Drawing Sheets

ENGINE PLANT COMPRISING A PLURALITY OF TURBO-CHARGED COMBUSTION ENGINES

BACKGROUND OF THE INVENTION

This invention relates to an engine plant comprising a plurality of turbocharged combustion engines having each an individual charging air system and an exhaust gas system, and of the type in which the charging air systems of the individual engines are interconnected by means of a closeable conduit, and in which control members are provided for opening and closing a stop valve provided in the conduit in dependence on the working condition of an associated engine.

Such a plant has been described in Applicants' U.S. application Ser. No. 922,339, filed on Oct. 23, 1986, now U.S. Pat. No. 4,787,207. The novel feature of the plant dealt with therein consists in the pipe connection between the charging air systems of the engines which makes it possible to utilize the surplus air generated by the turbocharger of a loaded engine for increasing the charging air pressure of an unloaded engine. In this context an unloaded engine is an engine working at less than about 25% of its maximum load, while a loaded engine is an engine working at about 50% to 100% of its maximum load.

The predominant problem is that the charging air pressure generated by the turbocharger of an unloaded engine at one time falls below the exhaust gas pressure so that exhaust gas may blow back into the air and gas passages of the engine and there cause problems in the form of increasing contamination. The reason why said problem may advantageously be solved by the pipe connection between the individual charging air systems is that the turbocharger of a loaded engine within said working range generates a considerable amount of surplus energy in the form of pressurized charging air.

For the purpose of controlling the supplementary supply of charging air a stop valve is provided in the mutual pipe connection upstream of one or more of the engines. Said valve is adapted to open and close in dependence on the actual working situation of the associated engine which is in practice determined by a comparison between the instantaneous values of the charging air pressure and the exhaust gas pressure, respectively. If the charging air pressure exceeds the exhaust gas pressure, supplementary charging air is not needed and the valve is therefore kept closed. If, on the contrary, the exhaust gas pressure exceeds the charging air pressure, a supplementary supply of charging air is needed and the valve must therefore be opened.

As mentioned, the control of the valve is based on a comparison between the charging air pressure and the exhaust gas pressure of the associated engine. Consequently, it is of vital importance as regards a correct control of the valve that a reliable and exact measuring of the proportion between said two pressures is available. Such a measuring may in principle be effected by a common differential pressure guage. In practice it has, however, turned out to be impossible to apply such a device successfully. Firstly, the conduit connecting the pressure gauge with the exhaust gas receiver was rapidly blocked by soot and condensed water and, secondly, it turned out to be complicated as well as expensive to manufacture a pressure gauge that is both sufficiently accurate at a differential pressure of a few millibars and which at the same time is capable of standing differential pressures up to about 1 bar.

SUMMARY OF THE INVENTION

The engine plant according to the invention differs from prior art plants in that the control members include a surveillance unit having a bipartite flow duct with a collective stem and two separated branches, that the stem is in flow connection with a discharge pipe, that the first branch is in flow connection with the charging air system of the associated engine, that the second branch is in flow connection with the exhaust gas system of the associated engine, that either of the two branches accommodates a thermosensor for the gas flow in the actual branch and that the thermosensors are controllably connected with the stop valve.

This provides for eliminating in a simple manner the above mentioned problems because no "standing" pressure is to be measured (or any other pressure) but only the temperature of two continuous gas flows which may be effected extremely exactly, irrespective of the related pressure conditions.

The opening and closing of the stop valve are in other words made dependent on whether or not there exists a temperature difference between the thermosensors, since such a difference unambiguously indicates the order of magnitude between said two pressures or, put more specifically, which of the pressures is the highest one.

The discharge tube of the surveillance unit and the flow connection with the exhaust gas system of the associated engine are advantageously made in such a manner that their flow resistances exceed the flow resistance of the flow connection between the surveillance unit and the charging air system of the same engine. This ensures that during normal working of the engine charging air is available in both of the branches of the surveillance unit and thus also air of approximately the same temperature around both of the thermosensors accommodated therein.

As it will be immediately recognized the entire duct system of the surveillance unit with associated conduit connections is in any working condition incessantly blown through by continuous air and/or gas flows with the positive result that the unit so to say is self-purifying and thus provides for a very high degree of reliability.

BRIEF DESCRIPTION OF THE DRAWING

The invention will now be described in more detail with reference to the drawings, in which.

DETAILED DESCRIPTION

Figure 1:
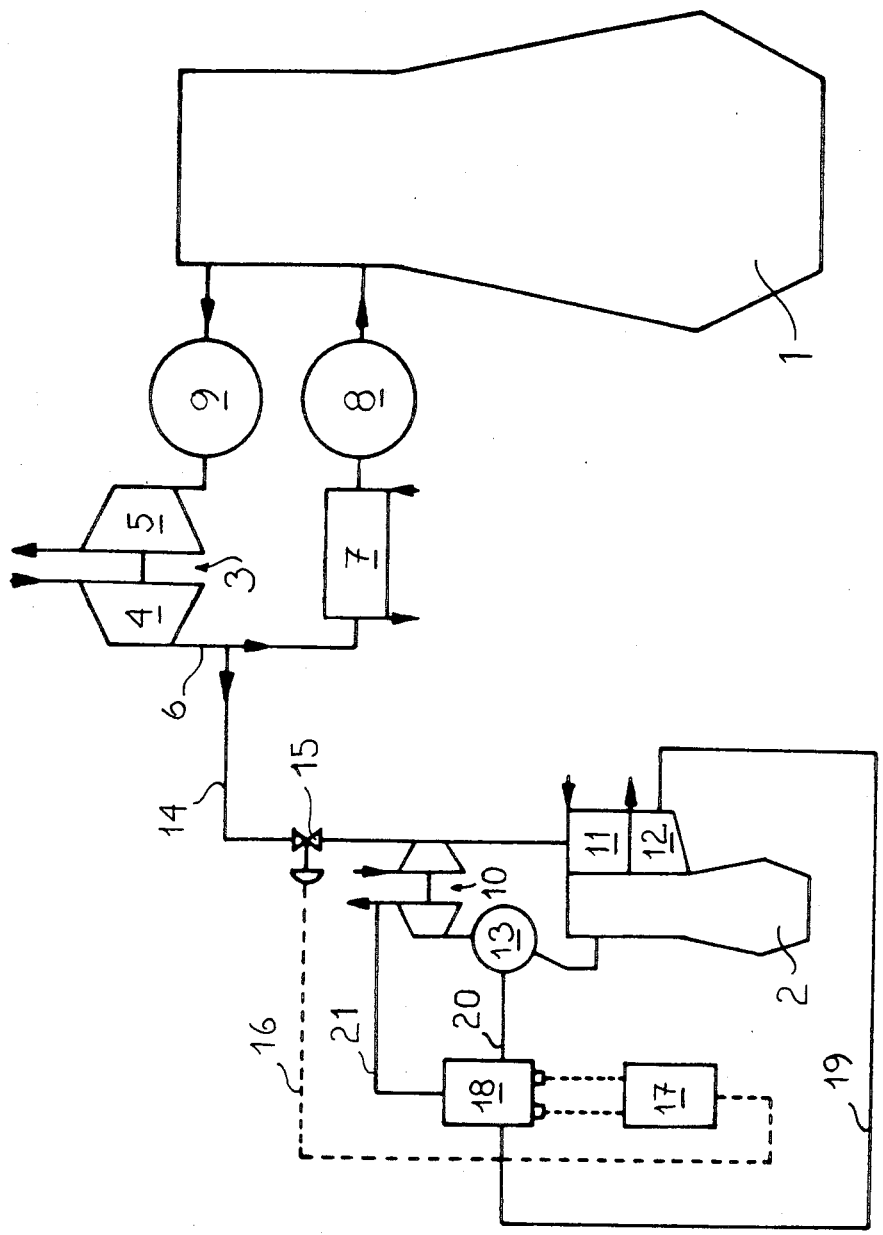
FIG. 1 is a schematical view of an engine plant according to the invention for use in a ship and including a main engine and an auxiliary engine.

The engine plant illustrated in FIG. 1 includes a comparatively large, constant pressure turbocharged diesel main engine 1 for propelling the ship and a minor, likewise turbocharged auxiliary engine 2 for driving an electro-generator, not shown. Main engine 1 includes a turbocharger 3 with a compressor part 4 and a turbine part 5. The compressed charging air is delivered from compressor part 4 through a duct 6 to a charging air cooler 7 and from there through a charging air receiver 8 to the individual cylinders of engine 1.

Turbocharger 3 is driven by the exhaust gases generated by the combustion and supplied through an exhaust gas receiver 9 to turbine part 5 of turbocharger 3.

Auxiliary engine 2 analogously includes a turbocharger 10, a charging air cooler 11, a charging air receiver 12 and an exhaust gas receiver 13.

Through a conduit 14 extending from duct 6 between compressor part 4 and charging air cooler 7 the charging air system of main engine 1 is connected with the charging air system of auxiliary engine 2. As illustrated, the connection to auxiliary engine 2 is located in the compressor housing of the turbocharger 10.

Conduit 14 accommodates a stop valve 15 which is controlled by a control unit 17, as illustrated by a dotted signal line 16. Control unit 17 is electrically coupled to two thermosensors accommodated within a surveillance unit 18 and adapted to generate a control signal to valve 15 on the basis of a comparison of signals received from said thermosensors.

Surveillance unit 18 is by a conduit 19 connected with the charging air receiver 12 of auxiliary engine 2 and by a conduit 20 connected with exhaust gas receiver 13 of the same engine. Moreover, unit 18 is by a conduit 21 connected with the exhaust pipe of engine 2 downstream of the turbine part of turbocharger 10. Conduit 19 may for instance be provided with a one-way valve, not shown, or the like, preventing hot exhaust gases—e.g. in case conduit 20 is blocked—from blowing back through conduit 19 to the charging air system of the engine.

Figure 2:
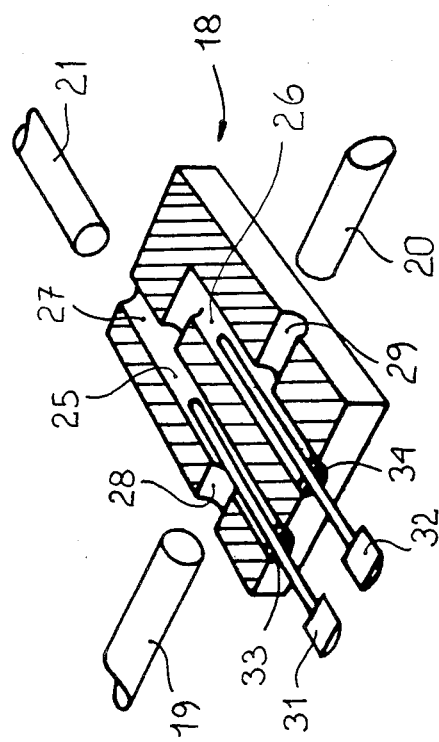
FIG. 2 is a schematically perspective view of a plan section through the surveillance unit in FIG.1.

As it will appear from FIG. 2 surveillance unit 18 is provided with an internal duct system including a first branch 25, a second branch 26 and a common stem 27. Branch 25 which is adapted to be coupled to conduit 19 through a bore 28 accommodates a first thermosensor 31, while branch 26 which is adapted to be coupled to conduit 20 through a bore 29 accommodates a second thermosensor 32. As shown, branches 25 and 26 fit closely about thermosensors 31 and 32, respectively. Stem 27 is coupled to conduit 21.

Surveillance unit 18 operates as follows: When engine 2 runs normally the charging air pressure supplied through conduit 19 exceeds the exhaust gas pressure supplied through conduit 20. Consequently, the entire duct system of unit 18 will be blown through by charging air and the two thermosensors 31 and 32 will measure the same temperature in the respective branches 25 and 26. The signals generated by the thermosensors will be compared in control unit 17, resulting in that a signal is delivered to stop valve 15, meaning in this case that the valve is kept closed.

When engine 2 runs unloaded or in so-called stand-by mode, the exhaust gas pressure in conduit 20 exceeds the charging air pressure in conduit 19. Since bore 29 and stem 27 have a smaller diameter—and thus a larger flow resistance—than bore 28 the pressure conditions prevailing during stand-by mode will result in that branch 26 is blown through by hot exhaust gas, while branch 25 is blown through by cooler charging air. As above, the combined gas flow discharges from unit 18 through conduit 21. Therefore, the thermosensors will in this case register two different temperatures and a temperature difference will be recorded in control unit 17, entailing that a signal is delivered to valve 15, meaning that the valve opens. Supplementary charging air is then supplied to auxiliary engine 2 from the charging air system of main engine 1.

The supplementary supply of charging air means that the charging air pressure supplied to unit 18 through conduit 19 is again caused to exceed the exhaust gas pressure supplied through conduit 20. In order to prevent this from resulting in that valve 15 closes again instantaneously, a time delay or some sort of logic ensuring that valve 15 does not continuously open and close in constant stand-by mode is incorporated in unit 17. As unit 17 typically constitutes a part of a PLC-system the mentioned logic or time delay may directly form part of the control program of said system.

As regards the duct dimensions of surveillance unit 18 in relation to the associated engine, the dimensions are adapted to the engine in such a manner that the maximum amount of charging air flowing through unit 18 is less than about 1% of the total consumption of charging air or, in other words, so small that said "lost" amount of air does not at all affect the running of the engine.

The surveillance unit—which in the preceding has solely been described as controllably connected with the stop valve—may as well be used for the control of other operations relating to the detected working condition. The surveillance unit may thus advantageously—for instance through control unit 17—also be controllably connected with the change-over valves controlling the water supply of charging air cooler 11. If desired, said control may be effected in such a manner that hot water is supplied to the charging air cooler when the engine runs unloaded and cold water may be supplied to said cooler when the engine runs loaded.

What is claimed:

1. An engine part comprising a plurality of turbocharged combustion engines (1, 2) having each an individual charging air system and an exhaust gas system, and of the type in which the charging air systems of the individual engines are interconnected by means of a closeable conduit (14), and in which control members (17, 18) are provided for opening and closing a stop valve (15) provided in the conduit in dependence on the working condition of one of said plurality of turbocharged combustion engines (2), wherein the control members include a surveillance unit (18) having a bipartite flow duct with a collective stem (27) and two separated branches (25, 26), the stem (27) is in flow connection with a discharge pipe (21), the first branch (25) is in flow connection with the charging air system of said one of the plurality of turbocharged engines, the second branch (26) is in flow connection with the exhaust gas system of said one of the plurality of turbocharged engines, each of the two branches accommodates a thermosensor (31, 32) for the gas flow in the actual branch, and the thermosensors (31, 32) are controllably connected with the stop valve (15).

2. An engine plant as claimed in claim 1, wherein the discharge tubes (27, 21) of the surveillance unit and the flow connection (29, 20) with the exhaust gas system of one of said plurality of turbocharged combustion engines are made in such a manner that their flow resistances exceed the flow resistance of the flow connection (28, 19) between the surveillance unit and the charging air system of the same engine.

* * * * *